United States Patent
Zein et al.

(10) Patent No.: US 8,551,614 B2
(45) Date of Patent: Oct. 8, 2013

(54) THREE-LAYER WRAPPING AND A PROCESS FOR MANUFACTURING A PACKAGING USING THE SAME

(75) Inventors: Haidar Canfora Zein, Sao Paulo (BR); Suzana Yuri Kaneco, Sao Paulo (BR); Francisco Jose Carlini Kohn, Sao Paula (BR)

(73) Assignee: International Paper Company, Memphis, TN (US)

( * ) Notice: Subject to any disclaimer, the term of this patent is extended or adjusted under 35 U.S.C. 154(b) by 270 days.

(21) Appl. No.: 12/980,676

(22) Filed: Dec. 29, 2010
(Under 37 CFR 1.47)

(65) Prior Publication Data
US 2011/0212327 A1    Sep. 1, 2011

Related U.S. Application Data

(60) Provisional application No. 61/290,587, filed on Dec. 29, 2009.

(51) Int. Cl.
*B32B 27/10* (2006.01)
*B32B 37/10* (2006.01)
*B65B 11/00* (2006.01)
*B65B 49/00* (2006.01)

(52) U.S. Cl.
USPC ..... 428/337; 428/339; 428/425.1; 428/479.3; 428/481; 428/507; 428/533; 428/534; 428/537.5; 53/461; 156/269; 156/290; 156/324

(58) Field of Classification Search
USPC ........ 428/337, 339, 423.1, 425.1, 479.3, 481, 428/507, 533, 534, 537.5; 156/269, 290, 156/324; 53/461
See application file for complete search history.

(56) References Cited

U.S. PATENT DOCUMENTS

| | | | |
|---|---|---|---|
| 3,057,539 A | | 10/1962 | Leary |
| 3,423,277 A | * | 1/1969 | Dipner ........................ 428/157 |
| 3,455,302 A | * | 7/1969 | Liloia et al. .................. 128/849 |
| 3,750,361 A | | 8/1973 | Stevens |
| 4,022,965 A | | 5/1977 | Goheen et al. |
| 4,075,136 A | | 2/1978 | Schaper |
| 4,166,894 A | | 9/1979 | Schaper |
| 4,174,417 A | | 11/1979 | Rydell |
| 4,431,481 A | | 2/1984 | Drach |
| 4,496,427 A | | 1/1985 | Davison |
| 4,950,510 A | | 8/1990 | Massouda |
| 4,986,882 A | | 1/1991 | Mackey et al. |

(Continued)

FOREIGN PATENT DOCUMENTS

| | | |
|---|---|---|
| AU | 717450 | 3/2000 |
| BR | 8803906 | 2/1989 |

(Continued)

*Primary Examiner* — Thao T. Tran
(74) *Attorney, Agent, or Firm* — Thomas W. Barnes, III; John K. Pike

(57) ABSTRACT

One embodiment provides a wrapping, comprising a first layer of synthetic polymeric material; a second layer of synthetic polymeric material; and a layer of natural material sandwiched between at least a portion of the first and second layers; wherein the first and second layers are wider than the layer of natural material and extend beyond opposing ends of the layer of natural material to form tabs, the tabs comprising said first and second layers sandwiched together without the layer of natural material therebetween. Methods of making and using are disclosed.

19 Claims, 2 Drawing Sheets

(56) References Cited

U.S. PATENT DOCUMENTS

| | | | |
|---|---|---|---|
| 5,049,235 A | 9/1991 | Barcus et al. |
| 5,057,359 A | 10/1991 | Merdem et al. |
| 5,072,572 A | 12/1991 | Meives et al. |
| 5,122,415 A | 6/1992 | Schinkel et al. |
| 5,160,789 A | 11/1992 | Barcus et al. |
| 5,209,953 A | 5/1993 | Grupe et al. |
| 5,244,702 A | 9/1993 | Finestone et al. |
| 5,250,348 A | 10/1993 | Knauf |
| 5,266,250 A | 11/1993 | Kroyer |
| 5,360,420 A | 11/1994 | Cook et al. |
| 5,443,899 A | 8/1995 | Barcus et al. |
| 5,520,970 A | 5/1996 | Christensson et al. |
| 5,531,728 A | 7/1996 | Lash |
| 5,552,011 A | 9/1996 | Lin |
| 5,662,773 A | 9/1997 | Frederick |
| 5,667,637 A | 9/1997 | Jewell et al. |
| 5,698,074 A | 12/1997 | Barcus et al. |
| 5,698,688 A | 12/1997 | Smith et al. |
| H1704 H | 1/1998 | Wallajapet et al. |
| 5,709,897 A | 1/1998 | Pearlstein |
| 5,731,080 A | 3/1998 | Cousin et al. |
| 5,849,128 A | 12/1998 | Kobinata et al. |
| 6,022,612 A | 2/2000 | Wilkie |
| 6,048,829 A | 4/2000 | Milio et al. |
| 6,146,494 A | 11/2000 | Seger et al. |
| 6,242,397 B1 | 6/2001 | Milio et al. |
| 6,361,651 B1 | 3/2002 | Sun |
| 6,364,988 B1 | 4/2002 | Lin |
| 6,379,605 B1 | 4/2002 | Lin |
| 6,471,824 B1 | 10/2002 | Jewell |
| 6,506,282 B2 | 1/2003 | Hu et al. |
| 6,520,322 B2 | 2/2003 | Moss |
| 6,579,414 B2 | 6/2003 | Jewell |
| 6,579,415 B2 | 6/2003 | Jewell |
| 6,582,557 B2 | 6/2003 | Jewell |
| 6,592,712 B2 | 7/2003 | Koukoulas et al. |
| 6,592,717 B2 | 7/2003 | Jewell |
| 6,652,984 B2 | 11/2003 | Finestone et al. |
| 6,797,395 B2 | 9/2004 | Finestone et al. |
| 6,803,094 B1 | 10/2004 | Wheat et al. |
| 6,818,346 B2 | 11/2004 | Arent et al. |
| 7,097,895 B2 | 8/2006 | Amendt et al. |
| 7,789,291 B2 * | 9/2010 | Andersson et al. ........ 229/87.05 |
| 2001/0053441 A1 | 12/2001 | Sperlich et al. |
| 2002/0146571 A1 | 10/2002 | Babcock et al. |
| 2003/0143392 A1 * | 7/2003 | Nowak et al. ................ 428/342 |
| 2003/0190474 A1 | 10/2003 | Nowak et al. |
| 2003/0199218 A1 | 10/2003 | Mueller et al. |
| 2004/0009732 A1 | 1/2004 | Nowak |
| 2004/0238608 A1 | 12/2004 | Van Gordon |
| 2005/0233116 A1 | 10/2005 | Mueller et al. |
| 2005/0287321 A1 | 12/2005 | Horsfield et al. |
| 2006/0027637 A1 | 2/2006 | Conrad et al. |
| 2006/0185808 A1 | 8/2006 | Nguyen |
| 2007/0160860 A1 | 7/2007 | Fiscus et al. |

FOREIGN PATENT DOCUMENTS

| | | |
|---|---|---|
| BR | 7700103 | 10/1997 |
| BR | PI04060717appl | 12/2004 |
| BR | PI5061741appl | 12/2005 |
| FR | 2328572 | 5/1977 |
| GB | 1107200 | 3/1968 |
| GB | 2367265 | 4/2002 |
| WO | 2006069425 | 7/2006 |
| WO | 2006081640 | 8/2006 |
| WO | 2009113094 | 9/2009 |

* cited by examiner

THREE-LAYER WRAPPING AND A PROCESS FOR MANUFACTURING A PACKAGING USING THE SAME

CROSS-REFERENCE TO RELATED APPLICATIONS

The present application is based on and claims priority to U.S. Provisional Application Ser. No. 61/290,587, filed Dec. 29, 2009, the entire contents of which are hereby incorporated by reference.

FIELD OF THE INVENTION

The present invention relates to a wrapping for packaging items such as, for example, reams of paper, and methods of making and using.

DISCUSSION OF THE BACKGROUND

Wrappings for packaging items are known. One example of a conventional wrapping is found in Brazilian Utility Model Patent MU 7700103-6, which refers to a packaging for sheets of paper comprising two layers, one being a biaxially oriented polypropylene film (BOPP) and the other consisting of a laminated material. This packaging has several disadvantages, such as requiring glue for sealing, which may result in the migration of the glue into the packaging, damaging the packed object and reducing the machinability performance of the wrapping during manufacturing. Moreover, the moisture and tear resistances of the wrappings are not satisfactory, and the wrapping cannot withstand transportation and handling.

Other examples of conventional wrappings are disclosed in Brazilian Patent Applications PI 0406071-7 and PI0506174-1, which consist of two layers of biaxially oriented polypropylene. Some characteristics of these biaxially oriented polypropylene layers, such as a tear orientation in the cross-sectional direction, which allows the wrapping to be torn without using tapes or perforated lines, are disclosed in Brazilian Patent Application PI 0406071-7. A heat-sealable polymer layer of biaxially oriented polypropylene film is disclosed in Brazilian Patent application PI 0506174-1. The subject wrappings of the latter disclosures also have the disadvantage that the packaging deteriorates during transportation and handling. Conventional wrappings do not provide the resistance and strength upon transportation and handling.

DETAILED DESCRIPTION OF THE SEVERAL EMBODIMENTS

Figure 1:
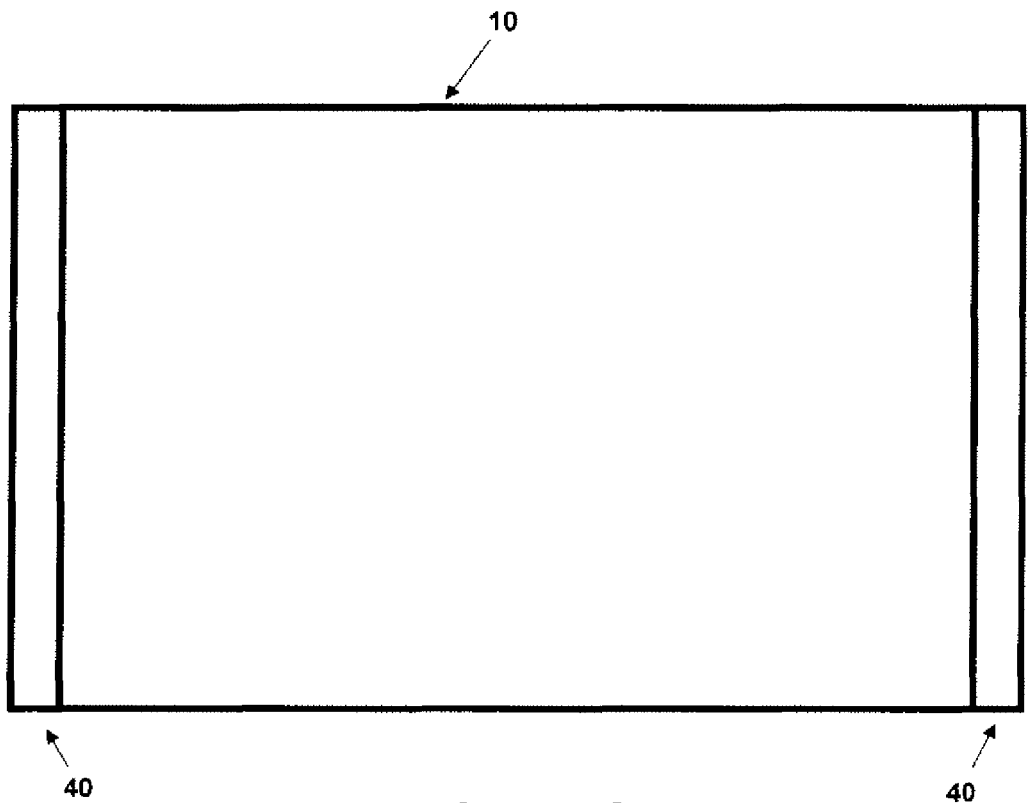
FIG. 1 is a top plan view of one embodiment of the wrapping.

One embodiment provides a wrapping, comprising:
a first layer of synthetic polymeric material;
a second layer of synthetic polymeric material; and
a layer of natural material sandwiched between at least a portion of the first and second layers;
wherein the first and second layers are wider than the layer of natural material and extend beyond opposing ends of the layer of natural material to form tabs, the tabs comprising said first and second layers sandwiched together without the layer of natural material therebetween.

Another embodiment provides a method for making the subject wrapping, comprising:
contacting the first layer with the layer of natural material, the first layer being wider than the layer of natural material and extending beyond opposing ends of the layer of natural material; and
contacting the second layer with the layer of natural material and, at least where the first layer extends beyond the opposing ends, with the first layer to form the tabs.

Another embodiment provides a method for wrapping a package, comprising:
contacting at least a portion of the subject wrapping with an article; heat sealing at least a portion of the tabs together, to form a wrapped package.

Another embodiment provides a wrapped article, comprising:
the subject wrapping; and
an article, wrapped therein.

Another embodiment, provides a wrapping, comprising:
a first layer of synthetic polymeric material;
a second layer of synthetic polymeric material; and
a layer of natural material sandwiched between the first and second layers;
wherein the first and second layers are wider than the layer of natural material to extend beyond opposing ends of the layer of natural material to form tabs comprising said first and second layers sandwiched together without the layer of natural material therebetween.

Another embodiment provides a three-layer wrapping comprising a layer of natural material sandwiched between two layers of synthetic polymeric material.

Another embodiment provides a wrapping that preserves the object to be packed, protecting it from wear factors, such as moisture, light, and others.

Another embodiment provides a wrapping with a high machinability performance upon manufacturing and handling.

Another embodiment provides a wrapping that maintains a stable structure when used to wrap a predetermined object.

Another embodiment provides a wrapping which does not easily tear when being carried or handled.

Another embodiment provides a wrapping comprising two layers of synthetic polymeric material and a layer of natural material sandwiched between said layers of synthetic polymeric material, wherein the layers of synthetic polymeric material are larger than the layer of natural material, which forms two tabs by overlapping said layers of synthetic polymeric material at each end of the wrapping.

Another embodiment provides a process for manufacturing a package using the wrapping comprising laminating the second layer of synthetic polymeric material to the layer of natural material, the layer of synthetic polymeric material being larger than the layer of natural material; laminating the first layer of synthetic polymeric material to the second layer of synthetic polymeric material and the layer of natural material, cutting the wrapping; heat sealing the wrapping by overlapping the tabs and heat sealing the remaining parts of the package.

The natural material is not particularly limited, and may include paper, cotton, or the like, and/or a plurality of cellulosic fibers. The type of cellulosic fiber is not critical, and any such fiber known or suitable for use in paper making can be used. For example, the natural material can made from pulp fibers derived from hardwood trees, softwood trees, or a combination of hardwood and softwood trees. The fibers may be prepared for use in a papermaking furnish by one or more known or suitable digestion, refining, and/or bleaching operations such as, for example, known mechanical, thermomechanical, chemical and/or semichemical pulping and/or other well known pulping processes. The term, "hardwood pulps" as may be used herein include fibrous pulp derived from the woody substance of deciduous trees (angiosperms) such as birch, oak, beech, maple, and eucalyptus. The term, "softwood pulps" as may be used herein include fibrous pulps derived from the woody substance of coniferous trees (gymnosperms) such as varieties of fir, spruce, and pine, as for example loblolly pine, slash pine, Colorado spruce, balsam fir and Douglas fir. In some embodiments, at least a portion of the pulp fibers may be provided from non-woody herbaceous plants including, but not limited to, kenaf, hemp, jute, flax, sisal, or abaca, although legal restrictions and other considerations may make the utilization of hemp and other fiber sources impractical or impossible. Either bleached or unbleached pulp fiber may be utilized. Recycled pulp fibers are also suitable for use.

The natural material may suitably contain from 1 to 99 wt % of cellulosic fibers based upon the total weight of the layer of natural material. In one embodiment, the natural material may contain from 5 to 95 wt % of cellulosic fibers based upon the total weight of the layer of natural material. These ranges include any and all values and subranges therebetween, for example, 1, 5, 10, 15, 20, 25, 30, 35, 40, 45, 50, 55, 60, 65, 70, 75, 80, 85, 90, 95 and 99 wt %.

The natural material may optionally contain from 1 to 100 wt % cellulosic fibers originating from softwood species based upon the total amount of cellulosic fibers in the natural material. In one embodiment, the natural material may contain 10 to 60 wt % cellulosic fibers originating from softwood species based upon the total amount of cellulosic fibers in the natural material. These ranges include 1, 2, 5, 10, 15, 20, 25, 30, 35, 40, 45, 50, 55, 60, 65, 70, 75, 80, 85, 90, 95, and 100 wt % and any and all ranges and subranges therein, based upon the total amount of cellulosic fibers in the natural material.

In one embodiment, the natural material may alternatively or overlappingly contain from 0.01 to 99 wt % fibers from softwood species, based on the total weight of the natural material. In another embodiment, the natural material may contain from 10 to 60 wt % fibers from softwood species based upon the total weight of the natural material. These ranges include any and all values and subranges therein. For example, the natural material may contain not more than 0.01, 0.05, 0.1, 0.2, 0.5, 1, 2, 3, 4, 5, 6, 7, 8, 9, 10, 12, 15, 20, 25, 30, 35, 40, 45, 50, 55, 60, 65, 70, 75, 80, 85, 90, 95 and 99 wt % softwood based upon the total weight of the natural material.

All or part of the softwood fibers may optionally originate from softwood species having a Canadian Standard Freeness (CSF) of from 300 to 750. In one embodiment, the natural material contains fibers from a softwood species having a CSF from 400 to 550. These ranges include any and all values and subranges therebetween, for example, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, and 750 CSF. Canadian Standard Freeness is as measured by TAPPI T-227 standard test.

The natural material may optionally contain from 1 to 100 wt % cellulosic fibers originating from hardwood species based upon the total amount of cellulosic fibers in the natural material. In one embodiment, the natural material may contain from 30 to 90 wt % cellulosic fibers originating from hardwood species, based upon the total amount of cellulosic fibers in the natural material. These ranges include 1, 2, 5, 10, 15, 20, 25, 30, 35, 40, 45, 50, 55, 60, 65, 70, 75, 80, 85, 90, 95, and 100 wt %, and any and all values and subranges therein, based upon the total amount of cellulosic fibers in the natural material.

In one embodiment, the natural material may alternatively or overlappingly contain from 0.01 to 99 wt % fibers from hardwood species, based upon the total weight of the natural material. In another embodiment, the natural material may alternatively or overlappingly contain from 60 to 90 wt % fibers from hardwood species, based upon the total weight of the natural material. These ranges include any and all values and subranges therebetween, including not more than 0.01, 0.05, 0.1, 0.2, 0.5, 1, 2, 3, 4, 5, 6, 7, 8, 9, 10, 12, 15, 20, 25, 30, 35, 40, 45, 50, 55, 60, 65, 70, 75, 80, 85, 90, 95, 99 and 99 wt %, based upon the total weight of the natural material.

All or part of the hardwood fibers may optionally originate from hardwood species having a Canadian Standard Freeness of from 300 to 750. In one embodiment, the natural material may contain fibers from hardwood species having CSF values of from 400 to 550. These ranges include 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, and 750 CSF, and any and all ranges and subranges therein.

The natural material may optionally contain less refined fibers, for example, less refined softwood fibers, less refined hardwood, or both. Combinations of less refined and more refined fibers are possible. In one embodiment, the natural material contains fibers that are at least 2% less refined than that of fibers used in conventional natural materials. This range includes all values and subranges therebetween, including at least 2, 5, 10, 15, and 20%. For example, if a conventional paper contains fibers, softwood and/or hardwood, having a Canadian Standard Freeness of 350, then, in one embodiment, the natural material may contain fibers having a CSF of 385 (i.e. refined 10% less than conventional) and still perform similar, if not better, than the conventional paper. Nonlimiting examples of some performance qualities of the natural material are discussed below. Examples of some reductions in refining of hardwood and/or softwood fibers include, but are not limited to: 1) from 350 to at least 385 CSF; 2) from 350 to at least 400 CSF; 3) from 400 to at least 450 CSF; and 4) from 450 to at least 500 CSF. In some embodiments, the reduction in fiber refinement may be at least 2, 3, 4, 5, 6, 7, 8, 9, 10, 11, 12, 13, 14, 15, 16, 17, 18, 19, 20, and 25% reduction in refining compared to those fibers in conventional natural materials.

When the natural material contains both hardwood fibers and softwood fibers, the hardwood/softwood fiber weight ratio may optionally range from 0.001 to 1000. In one embodiment, the hardwood/softwood ratio may range from 90/10 to 30/60. These ranges include all values and subranges therebetween, including 0.001, 0.002, 0.005, 0.01, 0.02, 0.05, 0.1, 0.2, 0.5, 1, 2, 5, 10, 15, 20, 25, 30, 35, 40, 45, 50, 55, 60, 65, 70, 75, 80, 85, 90, 95, 100, 200, 300, 400, 500, 600, 700, 800, 900, and 1000.

The softwood fibers, hardwood fibers, or both may be optionally modified by physical and/or chemical processes. Examples of physical processes include, but are not limited to, electromagnetic and mechanical processes. Examples of electrical modifications include, but are not limited to, processes involving contacting the fibers with an electromagnetic energy source such as light and/or electrical current. Examples of mechanical modifications include, but are not limited to, processes involving contacting an inanimate object with the fibers. Examples of such inanimate objects include those with sharp and/or dull edges. Such processes also involve, for example, cutting, kneading, pounding, impaling, and the like, and combinations thereof.

Nonlimiting examples of chemical modifications include conventional chemical fiber processes such as crosslinking and/or precipitation of complexes thereon. Other examples of suitable modifications of fibers include those found in U.S. Pat. Nos. 6,592,717, 6,592,712, 6,582,557, 6,579,415, 6,579,414, 6,506,282, 6,471,824, 6,361,651, 6,146,494, H1,704, 5,731,080, 5,698,688, 5,698,074, 5,667,637, 5,662,773, 5,531,728, 5,443,899, 5,360,420, 5,266,250, 5,209,953, 5,160,789, 5,049,235, 4,986,882, 4,496,427, 4,431,481, 4,174,417, 4,166,894, 4,075,136, and 4,022,965, the entire contents of each of which are hereby incorporated, independently, by reference. Still other examples of suitable modifications of fibers may be found in U.S. Application Nos. 60/654,712, filed Feb. 19, 2005, and 11/358,543, filed Feb. 21, 2006, the entire contents of each of which are hereby incorporated, independently, by reference.

The natural material may optionally include "fines." "Fines" fibers are typically those fibers with average lengths of not more than about 100 μm. Sources of "fines" may be found in SaveAll fibers, recirculated streams, reject streams, waste fiber streams, and combinations thereof. The amount of "fines" present in the natural material can be modified, for example, by tailoring the rate at which streams are added to the paper making process. In one embodiment, the average lengths of the fines are not more than about 5, 10, 15, 20, 25, 30, 35, 40, 45, 50, 55, 60, 65, 70, 75, 80, 85, 90, 95, and 100 μm, including any and all ranges and subranges therein.

If used, the "fines" fibers may be present in the natural material together with hardwood fibers, softwood fibers, or both hardwood and softwood fibers.

The natural material may optionally contain from 0.01 to 100 wt % fines, based on the total weight of the natural material. In one embodiment, the natural material may contain from 0.01 to 50 wt % fines, based upon the total weight of the layer of natural material. These ranges include all values and subranges therebetween, including not more than 0.01, 0.05, 0.1, 0.2, 0.5, 1, 2, 3, 4, 5, 6, 7, 8, 9, 10, 12, 15, 20, 25, 30, 35, 40, 45, 50, 55, 60, 65, 70, 75, 80, 85, 90, 95 and 100 wt % fines, based upon the total weight of the natural material.

Natural materials suitable for use herein may have any basis weight. It may have either a high or low basis weight, including basis weights of 1 lbs/3000 square foot or more, 5 to 500 lbs/3000 square foot, 10 to 325 lbs/3000 square foot. The basis weight may be 1, 2, 3, 4, 5, 6, 7, 8, 9, 10, 20, 30, 40, 50, 60, 70, 80, 90, 100, 125, 150, 175, 200, 225, 250, 275, 300, 325, 350, 375, 400, 425, 450, 475, and 500 lbs/3000 square feet or more, including any and all ranges and subranges therein.

One or both surfaces of the layer of natural material may be printed or unprinted. The layer of natural material may contain one or more colorants or fillers. One or both surfaces may include a printed image such as, for example, a text or other image describing the article packaged therein. Methods for printing such natural materials are known.

The polymer suitable for the first and/or second polymer layers is not particularly limited, so long as it is suitable for use as a wrapping material. Non-limiting examples include films comprising or made from any one or more of polymeric material, synthetic paper, organic polymer, biopolymer, carbohydrate, polysaccharide, starch, cellulose, glycogen, hemicellulose, chitin, fructan inulin, lignin, pectic substance, gum, protein, cereal, vegetable protein, animal protein, gluten (e.g. from wheat), whey protein, gelatin, colloid (e.g., natural hydro-colloid, polylactic, polygalactic, cellulosic film (e.g. microbial and/or regenerated cellulose film), thermoplastic polymer, thermoset polymer, polyolefin, (e.g. polypropylene and/or polyethylene, LDPE, HDPE), polystyrene, polyurethane, polyvinylhalide (e.g. PVC), polyester (e.g. polyethylene terephthalate—PET), polyamide (e.g. nylon), biaxially oriented polypropylene (BOPP), non-hydrocarbon polymer, homopolymer, copolymer, oriented polymer, or the like, or any combination of two or more thereof. One or both of the first and second layers may be single layer or multilayer, wherein each layer may be the same or different material. One or both of the first and second layers may themselves contain one or more paper layers, if desired. One or both of the first and second layers may be a monolithic sheet or composite sheet formed by any suitable combination and/or mixture of any of the foregoing material. Methods of forming polymer layers are known, and may include extrusion, blowing, co-extrusion, laminating, and the like, or any combination of two or more thereof.

One or both of the first and second layers may have one or more coatings thereon, or no coatings at all. Non-limiting examples of coatings include hot melt adhesive, polyamine, polyalkeneimine, polyethyleneimine, polyaziridine, polyester, nylon, polyethylene terephthalate, and combination of two or more thereof.

In one embodiment, the polymer film comprises biaxially oriented polypropylene (BOPP). In one embodiment, the BOPP film may have machine direction and transverse direction stretch ratios independently ranging from 4:1 to 10:1. These ratios include all values and subranges therebetween, for example, 4, 5, 6, 7, 8, 9, and 10:1.

The thickness of one or both of the first and second layers is not particularly limited. Non-limiting examples of thickness include 10 to 500 microns thick, although one or both of the first and second layers may be thinner or thicker as appropriate. The aforementioned range includes all values and subranges therebetween, including 10, 20, 30, 40, 50, 60, 70, 80, 90, 100, 200, 300, 400, and 500 microns or any combination thereof. In one embodiment, one or both of the first and second layers has a thickness ranging from about 30 to about 160 microns thick. In another embodiment, one or both of the first and second layers has a thickness ranging from about 50 to about 60 microns thick.

One or both of the first and second layers may be clear or may contain a colorant or filler. One or both may include a printed image such as, for example, a text or other image describing the article packaged therein. Methods for printing such surfaces are known.

In one embodiment, one or both of the first and second layers is clear BOPP having a thickness of 30 to 160 microns.

The three-layer wrapping is particularly suitable for wrapping reams of paper, but its use is not so limited. The three-layer wrapping may be suitably used to wrap or package any article. Non-limiting examples of articles which can be wrapped or packaged with the three-layer wrapping include consumer items, for example, toy, board game, compact disc, electronic item, boxed item, and others; food items, for example, cookie and/or cracker box, multi-pack item (e.g., case of water bottles, pack of diapers, etc.); office supply item, for example, ream of paper, etc.

In one embodiment, after the three layers are contacted with one another to form the subject wrap, one or both of the exterior or interior surfaces of the wrap may be printed with an image, lettering, or the like.

In one embodiment, however, the article to be wrapped is a ream of paper. Wrapping films are known in this context as ream wraps. Methods and machines for wrapping reams of paper are known. Non-limiting examples of machines that can be used in wrapping reams of paper are described in e.g. U.S. Pat. No. 3,750,361 and U.S. Pat. No. 5,072,572, the entire contents of which are hereby incorporated by reference.

Typically, to wrap a ream of paper, a web of polymer film is fed to a severing station where a length of film is cut off to form a sheet of sufficient size to be used as a wrapper around a stack of paper, e.g., a ream of paper. The stack of paper is then contacted with the sheet, and the sheet is then folded around the stack to overlap on itself and form a rectangular tube along the length of the stack and overlapping it at each end. Heat or other energy is then applied to form an overlapped girth seal along the length of the sheet to bond the surfaces at the overlapped portion. Each end of the tube is then tucked in and folded to form a so-called envelope seal with two overlapping trapezoidal shaped flaps. Heat or other energy is then applied to form a seal at each end of the wrapped stack to seal the two flaps overlap. In the present case, in one embodiment, the tabs can be heat sealed or sealed together with other suitable sealing energy at the girth seal, the end seal, or a combination thereof.

Methods of applying energy to seal a wrapped article are known, and are not particularly limited. Any method is suitable so long as it is sufficient to bond all or a portions of the overlapping tabs together. Typically, the applied energy will fuse the polymer film or a surface portion thereof together by melting. Once cooled, the melted portions crystallize to form a bond between the polymer films or surface portions thereof. Non-limiting examples of applied energies include heat, conductive heat, radiative heat, convective heat, ultrasonic welding, electromagnetic energy, laser, UV, IR, electron beam, pressure, or any combination of two or more thereof.

In one embodiment, the applied energy is that typically used commercially in the wrapping of polymer films around packaging, e.g., to wrap reams of paper. In one embodiment, the energy is applied at typical commercial temperatures, times, and pressures such as known in the art.

In one embodiment, the energy is applied to the overlapping tabs from one side only and not from both sides. In this embodiment, the energy is applied from the "outside-in" of the packaging after the wrapping has been wrapped around the article. This is unlike the sealing methods used, for example, to seal the top edge of a potato chip bag, (wherein opposing heated dies apply sealing heat and/or pressure to both sides of a sealed edge). In one embodiment, the energy is applied to one or more outer surfaces of the tabs or wrapping. In one embodiment, the energy is applied to one or more outer surfaces of the tabs or wrapping while one or more of the corresponding inner surface are facing or in contact with the article to be wrapped.

Figure 2:
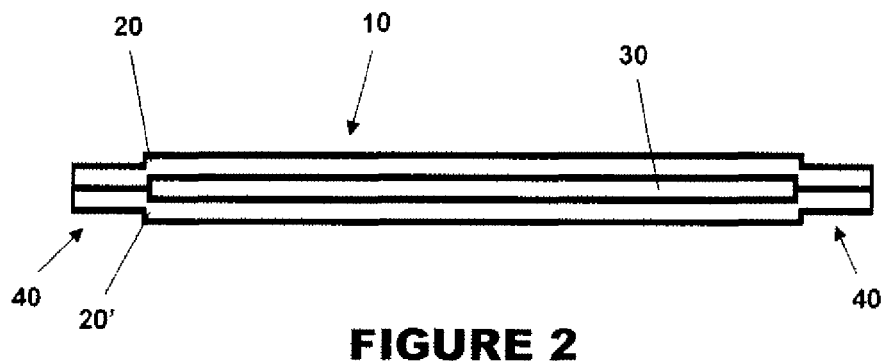
FIG. 2 is an expanded front plan view of one embodiment of the wrapping.

FIGS. 1 and 2 illustrate a top plan view of one embodiment of the wrapping, before being used to wrap a predetermined object. As can be seen from the Figures, one embodiment of the wrapping comprises three layers: two layers of layers of synthetic polymeric material 20, 20' and one layer of natural material 30 sandwiched between them. In one embodiment, synthetic polymeric material is biaxially oriented polypropylene (BOPP) and the natural material is paper. In one embodiment, glue is not used to seal the wrapping layers together. In one embodiment, heat sealing of the synthetic polymeric material to the natural material is not used. In one embodiment, the wrapping 10 is provided with tabs 40 at each end, solely consisting of synthetic polymeric material. In one embodiment, when packing an object using the wrapping, the package will be closed by heat sealing at the area where the tabs overlap one another themselves, which consist of synthetic polymeric material only.

Figure 3:
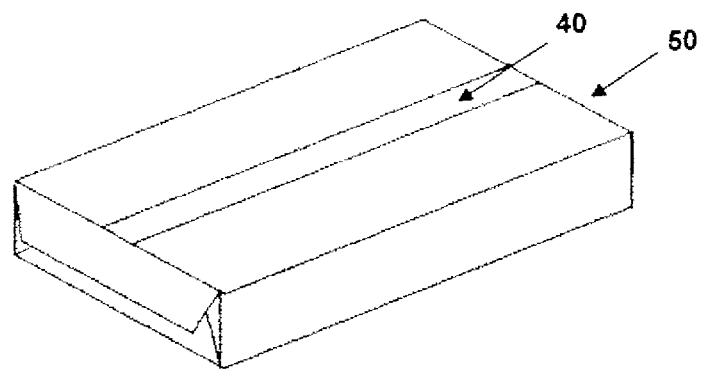
FIG. 3 is a perspective view of an object packed using one embodiment of the wrapping.

In one embodiment, such as shown in FIG. 2, the thickness of the wrapping is substantially smaller, due to the absence of the layer of natural material 30 in the tab area. In one embodiment, the wrapping comprising three layers 20, 30, 20' desirably maintains a rigid and stable structure by joining these three layers together. In one embodiment, the wrapping maintains a rigid and stable structure while also allowing the use of heat sealing to close the package. In one embodiment, such as shown in FIG. 3, the three-layer wrapping 10 is used to wrap a package of paper ream 50. In one embodiment, the wrapping tabs 40 overlap themselves and are closed using heat sealing, therefore closing a portion of or the entirety package. Both the paper stored inside the package and the external environment are in contact with the layer of synthetic polymeric material. In one embodiment, the structural stability of the package is obtained by the addition of the layer of natural material 30 between the two layers of synthetic polymeric material 20, 20'.

Figure 4:
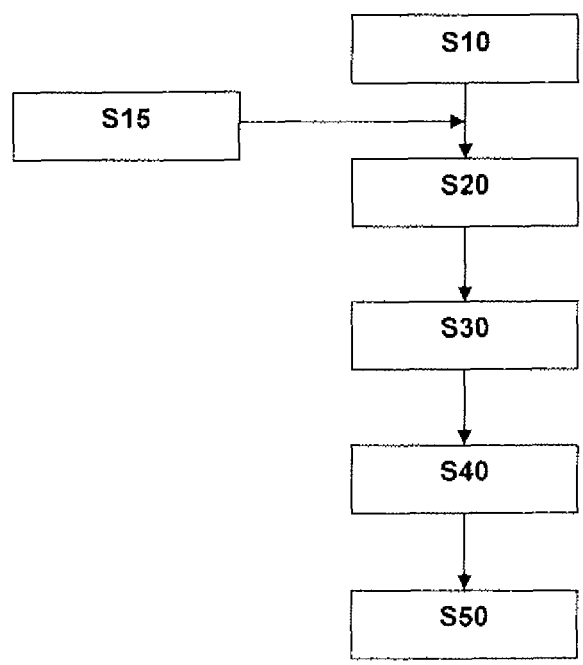
FIG. 4 is a block diagram illustrating one embodiment of the manufacturing process of a package using the wrapping.

In one embodiment, the present wrapping is manufactured according to the block diagram of FIG. 4. Initially, the layer of synthetic polymeric material 20' is laminated S10 to the layer of natural material 30. Subsequently, in a second lamination step S20, the layer of synthetic material 20 is laminated to the layers of synthetic polymeric material and natural material 20', 30. Alternatively, before the second lamination step, the layer of synthetic polymeric material 20 may be run through S15 a printing machine, where one or more of an image, lettering, coloring, or combination of two or more thereof may be applied as desired.

The layer of natural material is smaller than the layers of synthetic polymeric material, resulting in tabs that facilitate the heat sealing process.

In one embodiment, when used to package reams of paper, the wrappings are cut into predetermined shapes required to package the reams of paper. For example, for packaging an A4 ream of paper (width of 210 mm×height of 297 mm), the approximate size of the required wrapping is 550 mm width× 380 mm height, wherein the tabs 40 have a width of approximately 7.5 mm.

In one embodiment, the wrapping 10, after cut S30, is laid over the ream of paper and heat sealed S40 on the rear part of the package 50 where the tabs 40 are overlapped, along the longitudinal direction of the ream. Subsequently, the smaller cross-tabs are also heat sealed S50. In one embodiment, the smaller tabs do not need to consist only of synthetic polymeric material, as the heat sealing process is more efficient on smaller areas.

The invention claimed is:

1. A wrapping, comprising:
  a first layer of synthetic polymeric material;
  a second layer of synthetic polymeric material; and
  a layer of natural material sandwiched between at least a portion of the first and second layers;
  wherein the first and second layers are wider than the layer of natural material and extend beyond opposing ends of the layer of natural material to form tabs, the tabs comprising said first and second layers sandwiched together without the layer of natural material therebetween.

2. The wrapping of claim 1, wherein the natural material comprises one or more of paper, cotton, cellulosic fiber, kenaf, hemp, jute, flax, sisal, abaca, bleached pulp fiber, unbleached pulp fiber, recycled pulp fiber, or a combination of two or more thereof.

3. The wrapping of claim 1, wherein the natural material comprises one or more cellulosic fibers.

4. The wrapping of claim 1, wherein the natural material is paper.

5. The wrapping of claim 1, wherein the natural material is recycled paper.

6. The wrapping of claim 1, wherein one or both of the first and second layers comprise one or more polymeric material, synthetic paper, organic polymer, biopolymer, carbohydrate, polysaccharide, starch, cellulose, glycogen, hemi-cellulose, chitin, fructan inulin, lignin, pectic substance, gum, protein, cereal, vegetable protein, animal protein, gluten, whey protein, gelatin, colloid, hydro-colloid, polylactic, polygalactic, cellulosic film, thermoplastic polymer, thermoset polymer, polyolefin, polypropylene, polyethylene, LDPE, HDPE, polystyrene, polyurethane, polyvinylhalide, PVC, polyester, polyethylene terephthalate, polyamide, nylon, biaxially oriented polypropylene, non-hydrocarbon polymer, homopolymer, copolymer, oriented polymer, or any combination of two or more thereof.

7. The wrapping of claim 1, wherein the both the first and second layers are the same material.

8. The wrapping of claim 1, wherein the one or both of the first and second layers comprise one or more of thermoplastic polymer, thermoset polymer, polyolefin, polypropylene, polyethylene, LDPE, HDPE, polystyrene, polyurethane, polyvinylhalide, PVC, polyester, polyethylene terephthalate, polyamide, nylon, biaxially oriented polypropylene, homopolymer, copolymer, oriented polymer, or any combination of two or more thereof.

9. The wrapping of claim 1, wherein the one or both of the first and second layers comprise, one or more of polypropylene, polyethylene, LDPE, HDPE, polystyrene, polyurethane, polyvinylhalide, PVC, polyester, polyethylene terephthalate, polyamide, nylon, biaxially oriented polypropylene, homopolymer, copolymer, oriented polymer, or any combination of two or more thereof.

10. The wrapping of claim 1, wherein the one or both of the first and second layers biaxially oriented polypropylene.

11. The wrapping of claim 1, wherein one or both of the first and second layers are single layer or multilayered films.

12. The wrapping of claim 1, wherein one or both of the first and second layers are 10 to 500 microns thick.

13. The wrapping of claim 1, wherein one or both of the first and second layers is clear biaxially oriented polypropylene having a thickness of 30 to 160 microns.

14. A method for making the wrapping of claim 1, comprising:
  contacting the first layer with the layer of natural material, the first layer being wider than the layer of natural material and extending beyond opposing ends of the layer of natural material; and
  contacting the second layer with the layer of natural material and, at least where the first layer extends beyond the opposing ends, with the first layer to form the tabs.

15. The method of claim 14, further comprising heat sealing the first and second layers together at the tabs.

16. The method of claim 14, further comprising cutting the wrapping.

17. The method of claim 14, further comprising heat sealing the first and second layers to the layer of natural material.

18. A wrapped article, comprising: the wrapping of claim 1; and an article, wrapped therein.

19. The wrapped article of claim 18 which is a paper ream package.

\* \* \* \* \*